US012192726B2

(12) United States Patent
Gong et al.

(10) Patent No.: US 12,192,726 B2
(45) Date of Patent: Jan. 7, 2025

(54) SPEAKER

(71) Applicant: TIINLAB CORPORATION, Shenzhen (CN)

(72) Inventors: Xiaochao Gong, Shenzhen (CN); Shihchia Chiu, Shenzhen (CN); Xiaolin Deng, Shenzhen (CN)

(73) Assignee: TIINLAB CORPORATION, Shenzhen (CN)

( * ) Notice: Subject to any disclaimer, the term of this patent is extended or adjusted under 35 U.S.C. 154(b) by 218 days.

(21) Appl. No.: 17/822,434

(22) Filed: Aug. 26, 2022

(65) Prior Publication Data

US 2023/0217176 A1 Jul. 6, 2023

(30) Foreign Application Priority Data

Dec. 30, 2021 (CN) ........................ 202111662538.5

(51) Int. Cl.
*H04R 9/02* (2006.01)

(52) U.S. Cl.
CPC .................................. *H04R 9/025* (2013.01)

(58) Field of Classification Search
None
See application file for complete search history.

(56) References Cited

U.S. PATENT DOCUMENTS 5,461,677 A * 10/1995 Raj ........................ H04R 9/025 381/396
7,885,425 B2 * 2/2011 Matsumura ............ H04R 9/025 381/420
9,712,921 B2 * 7/2017 Salvatti .................... H04R 9/04
2022/0240020 A1 * 7/2022 Zhu .......................... H04R 9/06

* cited by examiner

*Primary Examiner* — Paul W Huber
(74) *Attorney, Agent, or Firm* — Andrew C. Cheng

(57) ABSTRACT

A speaker includes a vibration diaphragm, a voice coil, a first magnet, and a second magnet. Each of the first and second magnets includes an end adjacent to the voice coil and an end distant from the voice coil, of which magnetic polarities are opposite to each other. The ends of the first magnet and the second magnet that are adjacent to the voice coil are of opposite magnetic polarities. The voice coil is partly aligned with a gap between the first magnet and the second magnet. A portion of the voice coil is located between the end surfaces of the first and second magnets that exhibit a height difference. Due to the height difference, a path of the magnetic lines of force is shortened and the magnetic flux density in an area around the voice coil is thus increased, thereby increasing the BL value of electromechanical coupling factor.

12 Claims, 5 Drawing Sheets

SPEAKER

TECHNICAL FIELD

The present invention relates to the technical field of electroacoustic devices, and more particularly to a speaker.

DESCRIPTION OF THE RELATED ART

A speaker is a device that conducts electrical power through a voice coil and then cause induction with respect to a magnet such that the voice coil vibrates to further drive a vibration diaphragm to vibrate in order to generate sound. The value of electromechanical coupling factor BL is determined according to the magnetic flux density at the site where the voice coil is located. Conventional speakers are often constrained by the size of the enclosure so as to set the two magnets that generate magnetic lines of force of the same height. This elongates a path distance for transmission of magnetic lines of force from an N pole to an S pole, making the electromechanical coupling factor unsatisfactory for design needs.

SUMMARY OF THE INVENTION

The present invention aims to provide an improved speaker to resolve the technical problem of the known speaker that the value BL of the electromechanical coupling factor does not suit the needs for design.

In one aspect, the present invention provides a speaker which comprises a vibration diaphragm, a voice coil, a first magnet, and a second magnet. The voice coil is connected to the vibration diaphragm the first magnet comprises an end adjacent to the voice coil and an opposite end distant from the voice coil, of which magnetic polarities are opposite to each other. The second magnet comprises an end adjacent to the voice coil and an opposite end distant from the voice coil, of which magnetic polarities are opposite to each other. The ends of the first magnet and the second magnet that are adjacent to the voice coil are of opposite magnetic polarities. The voice coil has an effective width that is greater than a magnetic gap between the first magnet and the second magnet. At least a portion of the voice coil is arranged to correspond to the gap between the first magnet and the second magnet. The first magnet and the second magnet exhibit a height difference between end surfaces thereof on a same side, and at least a portion of the voice coil is located between the end surface of the first magnet and the end surface of the second magnet that exhibit the height difference.

In some embodiments, the height difference between the first magnet and the second magnet is greater than a thickness of the voice coil, and one of the first magnet and the second magnet that is relatively high has a magnet height that is less than 1.25 times of a magnet height of one of the first magnet and the second magnet that is relatively low.

In some embodiments, an avoidance notch is formed in the first magnet and/or the second magnet, and a portion of the voice coil is located at a site of the avoidance notch.

In some embodiments, a distance between a bottom surface of the voice coil and one of the first magnet and the second magnet that is relatively low is greater than a vibration amplitude of the voice coil, and a distance between a bottom surface of the vibration diaphragm and one of the first magnet and the second magnet that is relatively high is greater than the vibration amplitude of the voice coil.

In some embodiments, the first magnet comprises a first external magnet that is of a ring-shape, and the second magnet comprises a first internal magnet that is solid, and the first external magnet surrounds the first internal magnet.

In some embodiments, a hollow channel is formed in the first external magnet and communicates between outside and inside surfaces of the first external magnet, and the hollow channel communicates between a rear compartment of the speaker and an outside space.

In some embodiments, the speaker further comprises a second external magnet that is arranged opposite to the first external magnet, and a second internal magnet that is arranged opposite to the first internal magnet, and ends of the second external magnet and the first external magnet that correspond to each other have a same magnetic polarity, and ends of the second internal magnet and the first internal magnet that correspond to each other have a same magnetic polarity, and ends of the second external magnet and the second internal magnet that are on a same side have opposite magnetic polarities.

In some embodiments, a structure of the second external magnet is identical to a structure of the first external magnet, and/or a structure of the second internal magnet is identical to a structure of the first internal magnet.

In some embodiments, a height difference is formed between end surfaces of the first external magnet and the first internal magnet that are adjacent to the voice coil, and a height difference is formed between end surfaces of the second external magnet and the second internal magnet that are adjacent to the voice coil; and at least a portion of the voice coil is located between the end surface of the first external magnet and the end surface of the first internal magnet between which the height difference is formed, and/or, at least a portion of the voice coil is located between the end surface of the second external magnet and the end surface of the second internal magnet between which the height difference is formed.

In some embodiments, the second external magnet is provided, on a portion thereof that corresponds to the vibration diaphragm, an inward recessed portion, which corresponds, in shape, to a bent ring of the diaphragm film, and the inward recessed portion is recessed in a direction that is parallel to a direction in which the bent ring of the vibration diaphragm protrudes.

The beneficial efficacy of the present invention resides in that the speaker of the present invention comprises a voice coil, a first magnet, and a second magnet, and the first magnet and the second magnet are arranged adjacent, and magnetic lines of force are induced between the first magnet and the second magnet. The magnetic lines of force extend from an N pole of one magnet adjacent to the voice coil to an S pole of another magnet adjacent to the voice coil. The voice coil is arranged at ends of the two magnets that are at the same side and is located at a site in the magnetic lines of force. The magnetic lines of force, and thus the value of the magnetic flux density, determines the BL value of electromechanical coupling factor of the speaker, and thus, in order to enhance the magnetic flux, the present invention adopts a form in which the first magnet and the second magnet are arranged to exhibit a height difference, and the voice coil is located in the height difference site, but not contacting with the first magnet and the second magnet. Due to the height difference, a path distance along which the magnetic lines of force extend from the N pole to the S pole is shortened, so that the magnetic flux density in an area around the voice coil is increased, thereby increasing the BL value of electromechanical coupling factor, for suiting the needs of designs.

BRIEF DESCRIPTION OF THE DRAWINGS

To more clearly illustrate the technical solutions presented in the embodiments of the present invention, the following provides a brief description to the drawings that are essential for the illustration of technical solutions presented in the embodiments or those of the prior art. It is obvious that the drawings of which a description is provided below are just for some of the embodiments of the present invention, and for those having ordinary skill in the art, other drawings can be contemplated from theses without paying creative endeavor.

REFERENCE NUMBERS

Figure 1:
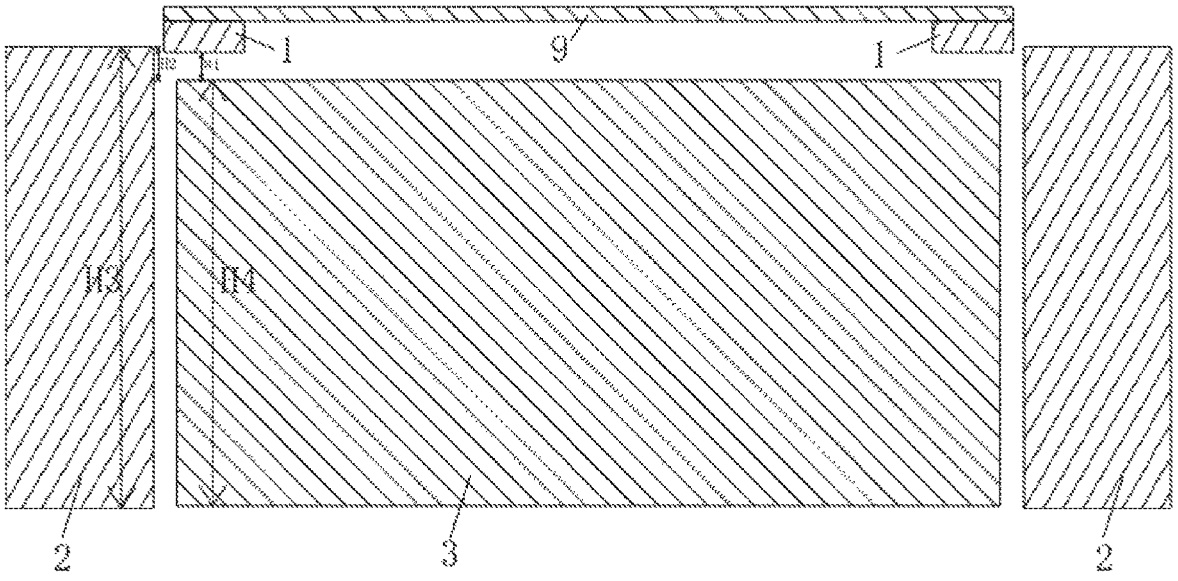
FIG. 1 is a first schematic view showing a voice and magnet assembling arrangement of a speaker provided in an embodiment of the present invention.

1, voice coil; 2. first external magnet; 3, first internal magnet; 4.; 5. second external magnet; 6. second inner magnet; 7. enclosure; 8. diaphragm film; 9. vibration diaphragm; 10. gasket ring; 11. inward recessed portion; 12. second sound port; 13. diaphragm ring; 14. cone; 15. First sound port

DETAILED DESCRIPTION OF PREFERRED EMBODIMENTS OF THE INVENTION

For better understanding of the technical issues to be resolved by the present invention and the technical solutions and the advantages of the present invention, the following provides a more detailed description of the present invention with reference to the embodiments of the present invention and the drawings. It is noted that the embodiments described herein are provided only for illustration of the present invention and are not intended to impose limitation to the present invention.

It is noted that if an element is described as being "fixed" or "arranged" on another element, it can be directly set on said another element or indirectly set on said another element. If an element is described as being "connected" to another element, it can be directly connected to said another element or indirectly connected to said another element.

Further, the terms "first" and "second" are provided for illustration only and should not be construed as indicating or suggesting relative importance or implying the quantity of the specific technical feature so indicated. Thus, a technical feature that is identified as being "first" or "second" may involve an explicit indication or an implication of including a single one or a plurality of such features. In the description of the present invention, "plurality" indicates two or more than two, unless a clear description is provided to the contrary. "Some" means one or more than one, unless a clear indication to the contrary is provided.

In the description of the present invention, it is noted that the terms, such as "center", "length", "width", "thickness", "up", "down", "front", "rear", "left", "right", "vertical", "horizontal", "top", "bottom", "inside", and "outside", which are provided to indicate orientation or positional relationship indicate such orientation or positional relationship as shown in the drawings and are provided for convenient description of the present invention and for simplification of the description, and are not intended to indicate or suggest that a specified device or component must involve a specific orientation or position, or must be constructed or operated in a specific orientation or position, and thus, should not be interpreted as limiting to the present invention.

In the description of the present invention, it is noted that, unless otherwise specified or set, the terms, such as "mounting", "interconnecting", and "connecting", should be interpreted in a broadest sense. For example, it can be made as being fixedly connected or releasably connected, or integrally connected; it can be made as being mechanically coupled or being electrically coupled; it can be made as being directly connected or indirectly connected via an intermediary medium, or being such that interiors of two elements are in communication with each other or two elements show a relationship of mutual action. For ordinary artisans of the art, interpretation of the meaning of the above-mentioned terms can be done according to an actual scenario.

Figure 2:
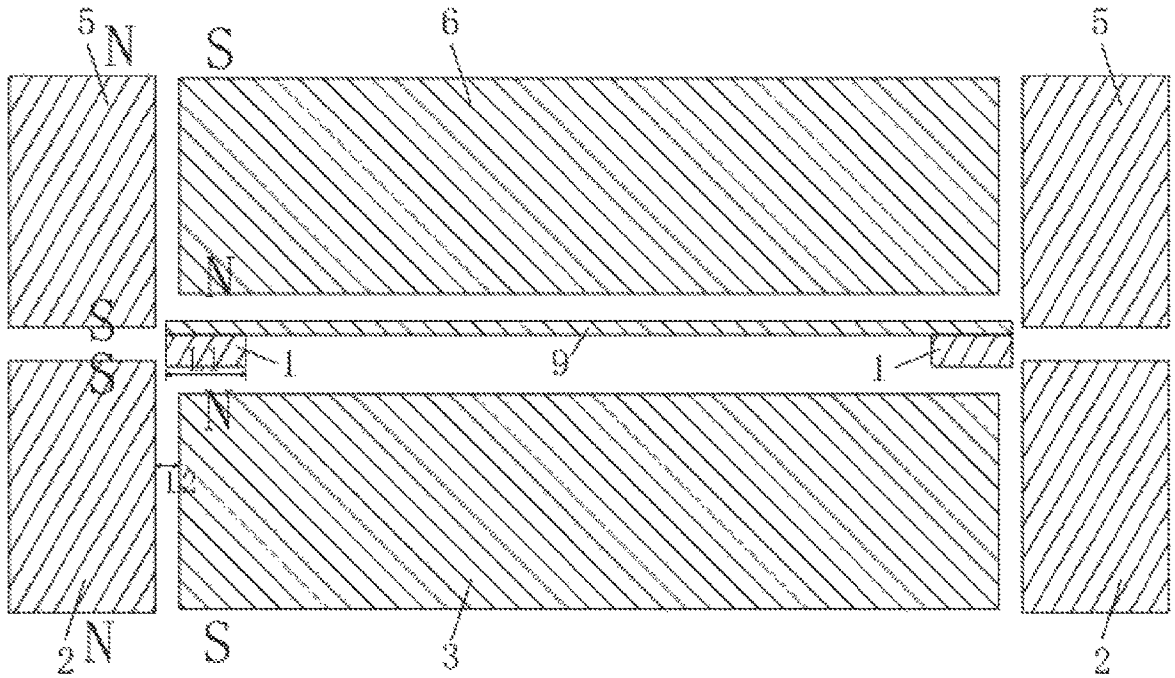
FIG. 2 is a second schematic view showing a voice and magnet assembling arrangement of a speaker provided in an embodiment of the present invention.
Figure 3:
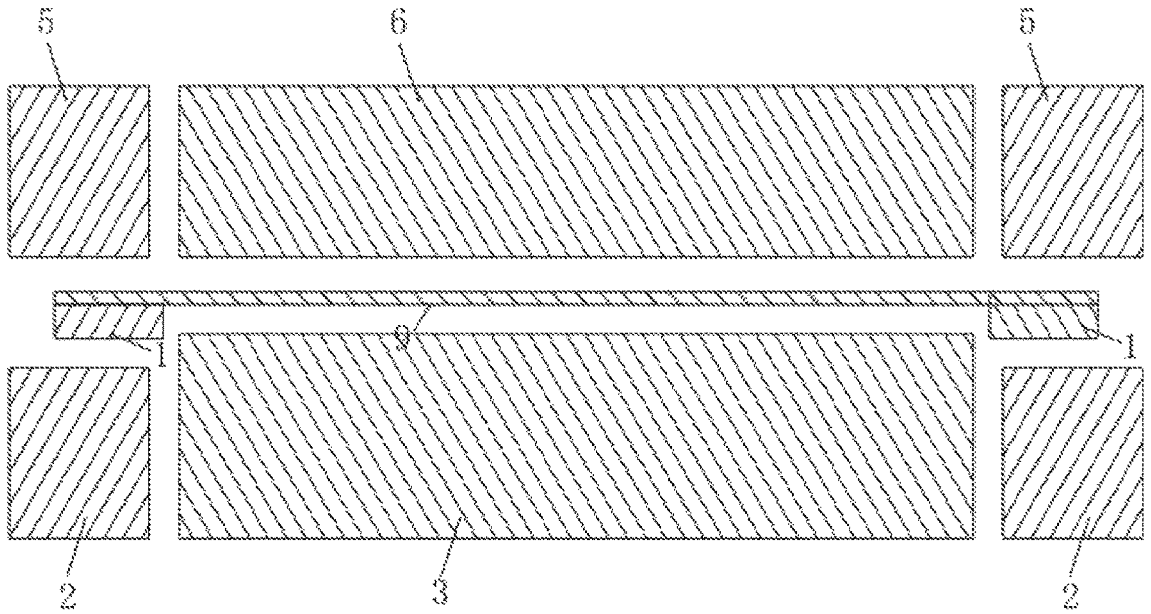
FIG. 3 is a third schematic view showing a voice and magnet assembling arrangement of a speaker provided in an embodiment of the present invention.

Referring to FIGS. 1 and 2, the present invention provides an embodiment of a speaker. The speaker provided in the instant embodiment comprises a vibration diaphragm 9, a voice coil 1, a first magnet, and a second magnet. The voice coil 1 is connected to the vibration diaphragm 9. The first magnet includes an end adjacent to the voice coil 1 and an opposite end distant from the voice coil 1. The first magnet is axially polarized. Magnetic polarities of the two opposite ends of the first magnet are opposite to each other. The second magnet includes an end adjacent to the voice coil 1 and an end distant from the voice coil 1. The second magnet is axially polarized. Magnetic polarities of the two opposite ends of the second magnet are opposite to each other. The ends of the first magnet and the second magnet that are adjacent to the voice coil 1 are of opposite magnetic polarities. The voice coil 1 has an effective width that is greater than a magnetic gap between the first magnet and the second magnet. At least a portion of the voice coil 1 is arranged to align with the gap between the first magnet and the second magnet. The first magnet and the second magnet exhibit a height difference between end surfaces thereof on a same side. At least a portion of the voice coil 1 is located between the end surface of the first magnet and the end surface of the second magnet that exhibit the height difference. That is, at least a portion of the voice coil 1 is overlapped with the first magnet or the second magnet in an axial direction of the voice coil 1. In operation, the voice coil 3 is electrified and acted upon by a magnetic field formed by the first and second magnets to reciprocally move in the axial direction of the voice coil 1. The first magnet and the second magnet exhibit the height difference in the axial direction.

Specifically, the speaker generates sound in such a manner as having magnetic lines of force passing through the voice coil 1 that is electrified to make the voice coil 1 vibrating so as to cause the vibration diaphragm 9 to vibrate, and an intensity of the magnetic flux of the magnetic lines of force passing through the voice coil 1 determines a BL value of electromechanical coupling factor.

To increase the magnetic flux at the site of the voice coil 1, the instant embodiment provides a manner of arranging the first magnet and the second magnet to exhibit the height difference, so as to increase the magnetic flux of the magnetic lines of force passing through the voice coil 1, and thus effectively increasing the BL value of electromechanical coupling factor.

In the instant embodiment, the intensity of the magnetic flux between the two magnets is determined by a path distance along which the magnetic lines of force to extend from an N pole to an S pole. The shorter the distance, the greater the magnetic flux density, and the longer the distance, the smaller the magnetic flux density. The instant embodiment arranges the two magnets to exhibit a height difference, and this shortens the path distance along which the magnetic lines of force extends from the N pole to the S pole, so as to increase the magnetic flux density around the voice coil 1.

In the instant embodiment, the height difference site between the two magnets has a more intense magnetic flux, and thus, the voice coil 1 is set at a position of the height difference site. At least a portion of the voice coil 1 is located in this site and at least a portion of the voice coil 1 is arranged to correspond to the gap between the first magnet and the second magnet. Since the magnetic flux density is greater at the site of the gap, the height difference site so referred to indicates a set-up location of the voice coil 1 is lower than the surface of the one that is located higher and higher than the surface of the one that is located lower, and is between the two surfaces, where the magnetic flux density is the greatest.

It is noted that in the instant embodiment, the height difference is only used to indicate that the end surfaces of the two that are adjacent to the voice coil 1 are not set on the same plane and show a difference in position, this being not limited to a difference in height in a vertical direction.

The voice coil has an effective width L1 (a width of a cross section of the voice coil 1 perpendicular to the circumferential direction of the voice coil 1, as shown in FIG. 2) that is greater than the magnetic gap L2 between the first magnet and the second magnet, in order to prevent the voice coil from falling into the gap between the first magnet and the second magnet.

As such, the beneficial advantage of the instant embodiment resides in that the first magnet and the second magnet are arranged in a manner as to exhibit a height difference, and the voice coil 1 is arranged at the height difference site, but is not in contact with the first magnet and the second magnet. Due to the height difference, the path distance for the magnetic lines of force to extend from an N pole of a magnet adjacent to the voice coil 1 to an S pole of another magnet adjacent to the voice coil 1 is shortened, so that the magnetic flux density in an area around the voice coil 1 is increased to thereby increase the BL value of electromechanical coupling factor to suit the needs of design. The width L1 of the voice coil is greater than the magnetic gap L2 between the first magnet and the second magnet, so as to ensure that the voice coil 1 does not get into the gap of the first magnet and the second magnet.

As shown in FIG. 1, further, the instant embodiment provides a preferred form of embodiment for the heights of the first magnet and the second magnet, which is, specifically, a height difference between the first magnet and the second magnet being greater than a thickness of a body of the voice coil 1, and one of the first magnet and the second magnet that is relatively high has a magnet height that is less than 1.25 times of a magnet height of the one that is relatively low.

The instant embodiment specifically defines that the height of the first magnet is H3, and the height of the second magnet is H4, wherein H3 is greater than H4, and the value of height difference between H3 and H4 is H2, and a distance from a bottom of the voice coil 1 to a surface of the second magnet is H1.

Then, the voice coil 1 is arranged, as desired, at the site of the height difference site H2, so as to be entirely or partly set therein. In case of being entirely set therein, there is a need for a sufficient amount of space to accommodate the voice coil 1, and consequently, the height difference H2 between the first magnet and the second magnet must be greater than the thickness of the voice coil 1 itself in order to entirely accommodate the voice coil 1 therein and make the voice coil 1 not get in contact with the surface of the magnet and prevent the voice coil 1 from being damaged. Thus, under the condition of ensuring the voice coil 1 does not contact or impact the surface of the magnet, H1 should be made as small as possible.

Further, H3 is less than 1.25 times of H4. The height difference H2 is normally arranged, but H2 should be less than one quarter of H4, so that at the outcome, H3 is less than 1.25 times of H4.

The instant embodiment specifically provides a height relationship between the two magnets and a range of difference, in order to ensure relatively intense magnetic flux and a reasonable design structure.

Further, there is also a requirement for the height of H3, because, generally, the speaker is provided, on the outside thereof, with an enclosure 7, and the size of the enclosure 7 is required to meet a standard specification. This makes it not possible to expand the size of the enclosure 7 in an arbitrary manner. As such, the height of H3, together with a height of sound outlet port, cannot be greater than an interior size of the enclosure 7. In case that two of such a first magnet are involved, then the heights of the two H3, in combination with the height of the sound outlet port, should not be greater than the interior size of the enclosure 7.

Figure 4:
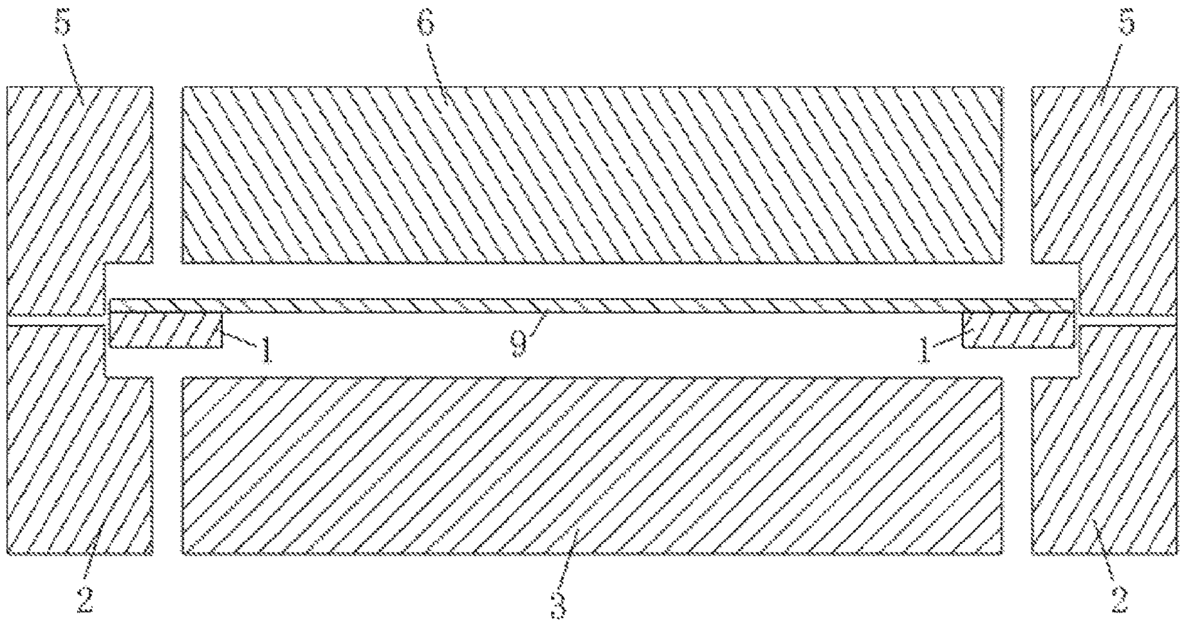
FIG. 4 is a fourth schematic view showing a voice and magnet assembling arrangement of a speaker provided in an embodiment of the present invention.
Figure 5:
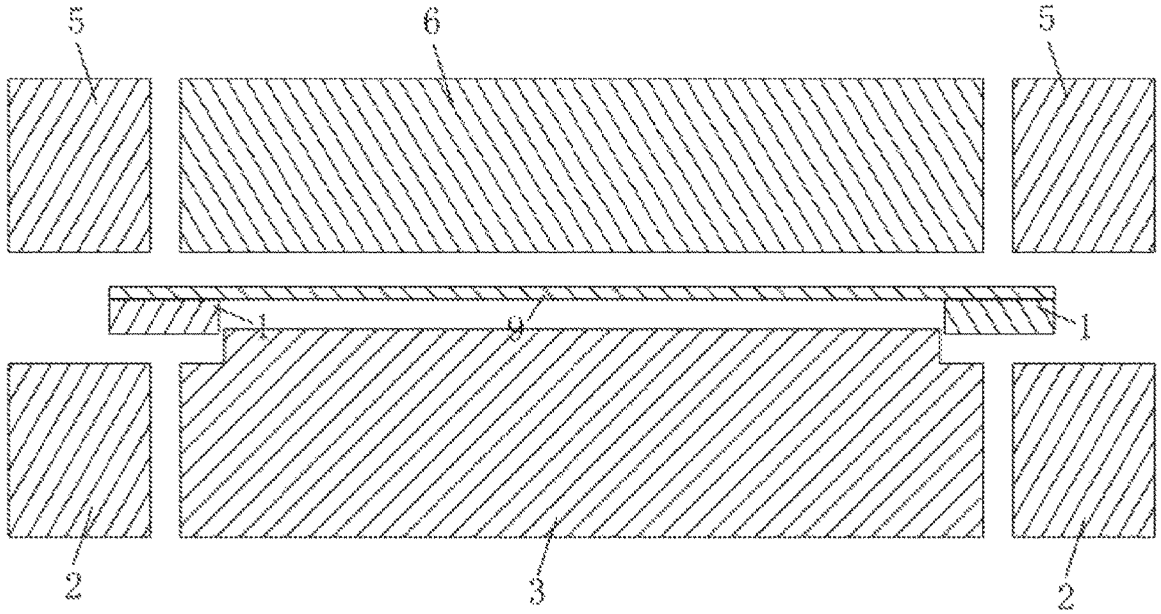
FIG. 5 is a fifth schematic view showing a voice and magnet assembling arrangement of a speaker provided in an embodiment of the present invention.
Figure 6:
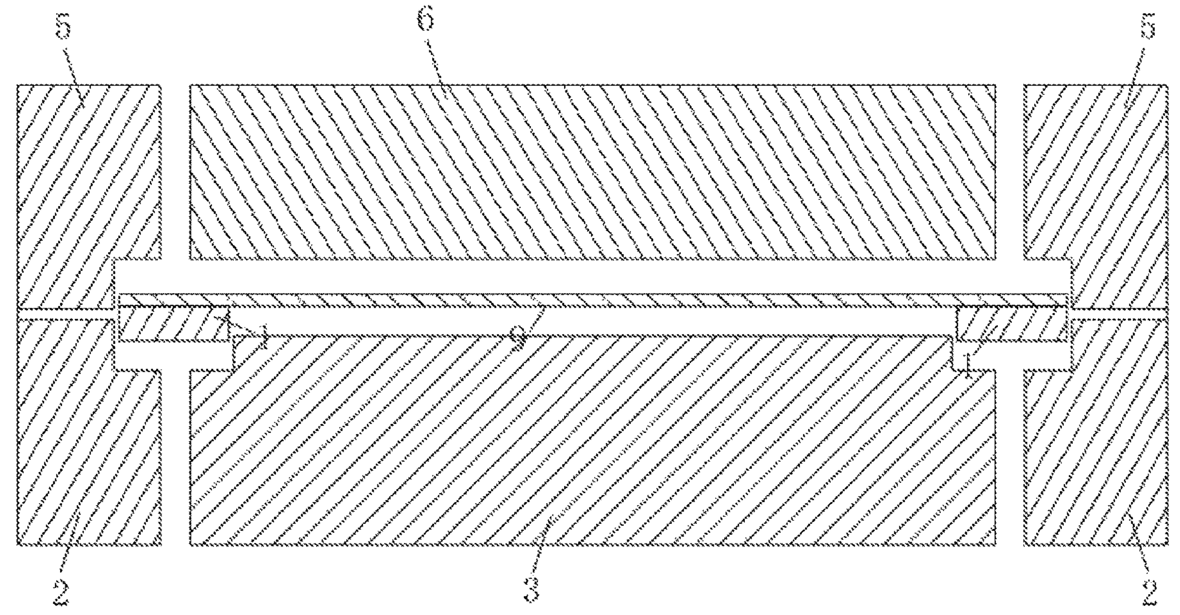
FIG. 6 is a sixth schematic view showing a voice and magnet assembling arrangement of a speaker provided in an embodiment of the present invention.

As shown in FIGS. 4-6, as a preferred way of implementation provided in the instant embodiment, an avoidance notch is formed in the first magnet and/or the second magnet, and a portion of the voice coil 1 is located in the avoidance notch.

Specifically, the preferred manner adopted in the instant embodiment includes option of the first magnet being higher than the second magnet, and also option of the second magnet being higher than the first magnet, in order to ensure a sufficient amount of space for accommodating the voice coil 1. The instant embodiment also adopts an avoidance notch being formed in the first magnet and/or the second magnet for capability of accommodating the voice coil 1.

Manners that can be adopted include: (1) forming the avoidance notch in the one that is relatively high; (2) forming the avoidance notch in the one that is relatively low; (3) forming the avoidance notch in both. It is noted here that for an avoidance notch being formed at a corner of the magnet, the formation of the avoidance notch does not affect the one that is relatively high being higher than the one that is relatively low and a highest surface of the one that is relatively high is still higher than a highest surface of the one that is relatively low.

The instant embodiment provides a sufficient amount of space for the arrangement of the voice coil 1, without affecting the magnetic flux, so that the arrangement of the voice coil 1 is made easier and the structure is more reasonable.

Further, in the instant embodiment, in a non-operating state, a distance between a bottom surface of the voice coil 1 and one of the first magnet and the second magnet that is relatively low is greater than a vibration amplitude of the voice coil 1. This ensures that the voice coil 1 does not get into contact with a surface of the one that is relatively low during a process of vibration, so as to prevent influence on sounding of the vibration diaphragm 9. Further, a distance between a bottom surface of the vibration diaphragm 9 and one of the first magnet and the second magnet that is relatively high is greater than the vibration amplitude of the voice coil 1, and this is arranged to make the vibration diaphragm 9 not get into contact with the magnet during a process of vibration.

As shown in FIGS. 1-8, as a preferred implementation way of embodying the speaker provided in the instant embodiment, the first magnet is a first external magnet 2 that is of a ring shape, and the second magnet is a first internal magnet 3 that is of a solid form, and the first external magnet 2 is arranged to surround the first internal magnet 3.

The instant implementation way adopts the first magnet being a first external magnet 2 and of a ring shape, and the second magnet being arranged as a solid first internal magnet 3. Such an arrangement is provided to correspond to the form of arrangement of the voice coil 1. The voice coil 1 is of a ring-shaped loop, so that the first magnet is arranged in a ring shape to allow magnetic lines of force to pass through all portions of the voice coil 1 in a circumferential direction.

Alternatively, the first magnet and the second magnet may adopt structures of other forms, provided they correspond to and match with an extension direction and extension form of the voice coil 1.

Further, when the voice coil 1 drives the vibration diaphragm 9 to generate sound, it is necessary to transmit sound waves to the outside. This requires an opening for such transmission. When the height of the first external magnet 2 is greater than the height of the first internal magnet 3, a certain degree of blocking is developed against the sound wave and thus the transmission is affected. To avoid such a problem, the instant embodiment provides a hollow channel 4 formed in the first external magnet 2 to communicate inside and outside surfaces of the first external magnet 2. The hollow channel 4 connects and communicates between a rear compartment of the speaker and the outside space in order to allow the sound wave to transmit therethrough. Thus, an effect of outputting sound is not decreased.

It is noted that the hollow channel 4 formed in the first external magnet 2 is modifiable in respect of the size and shape thereof according to an actual requirement so as to improve sound quality.

A feasible form of the hollow channel 4 includes a gap, a slit, an opening, a hole, or a slot formed in the first external magnet 2. Herein, no specific limitation is imposed on the shape of the hollow channel 4, provided that the hollow channel 4 connects between and communicates between the rear compartment of the speaker and the outside space, or alternatively the hollow channel 4 connects between and communicates between the front compartment of the speaker and the outside space.

As shown in FIGS. 2-7, as a preferred way of implementation of the speaker provided in the instant embodiment, the speaker may further comprise a second external magnet 5 that is arranged opposite to the first external magnet 2, and a second internal magnet 6 that is arranged opposite to the first internal magnet 3. The use of the second external magnet 5 and the second internal magnet 6 helps enhance the magnetic flux around the voice coil 1, and certain requirements are imposed on the arrangement of the second external magnet 5 and the second internal magnet 6 in order to have ends of the second external magnet 5 and the first external magnet 2 that correspond to each other have a same magnetic polarity, and ends of the second internal magnet 6 and the first internal magnet 3 that correspond to each other have a same magnetic polarity, and ends of the second external magnet 5 and the second internal magnet 6 that are on a same side have opposite magnetic polarities. This can make magnetic lines of force from the magnets 2/3/5/6 located at opposite sides of the voice coil 1 pass through the voice coil 1 with consistent directions and thus increases the intensity of the magnetic flux of the magnetic lines of force passing through the voice coil 1.

In such an arrangement, the second external magnet 5 may have a structure that is the same as the first external magnet 2; and the two are arranged symmetrically, meaning the second external magnet 5 and the first external magnet 2 have the same height and the same structure, and in case that the avoidance notch is included in the first external magnet 2, the second external magnet 5 is also formed with an avoidance notch, and/or the second internal magnet 6 and the first internal magnet 3 may also be structurally identical and arranged symmetrically, and have the same height and the same structure.

Thus, in the instant embodiment, a form of arrangement between the second external magnet 5 and the second internal magnet 6 can be identical to the form of arrangement between the first external magnet 2 and the first internal magnet 3, in order to enhance the magnetic flux around the voice coil 1.

Further, when both the first external magnet 2 and the second external magnet 5 are simultaneously included, and the heights of the first external magnet 2 and the second external magnet 5 are respectively higher than the first internal magnet 3 and the second internal magnet 6, then a gap between the first external magnet 2 and the second external magnet 5 is made smaller. In order not to decrease the effect of sounding, the first external magnet 2 and the second external magnet 5 are both formed with the hollow channel 4 to ensure the sound quality.

As shown in FIGS. 2, 4, and 6, as a preferred way of implementation of the speaker provided in the instant embodiment, a height difference is formed between end surfaces of the first external magnet 2 and the first internal magnet 3 that are adjacent to the voice coil 1, and a height difference is formed between end surfaces of the second external magnet 5 and the second internal magnet 6 that are adjacent to the voice coil 1. At least a portion of the voice coil 1 is located between the end surface of the first external magnet 2 and the end surface of the first internal magnet 3 that exhibits the height difference, and/or at least a portion of the voice coil 1 is located between the end surface of the second external magnet 5 and the end surface of the second internal magnet 6 that exhibits the height difference. In the arrangement, the first external magnet 2 has a height that is greater than a height of the first internal magnet 3, and the second external magnet 5 has a height that is greater than a height of the second internal magnet 6.

Beneficial efficacy the preferred way of implementation resides in that a magnet assembly including an internal magnet and a ring-shaped external magnet is adopted, and two of such a magnet assembly are arranged on two opposite sides of the voice coil 1 to form a closed-loop dual-side magnetic circuit structure, which forms a 360° all-directional magnetic field around the voice coil 1 to enhance the sensitivity of the speaker.

The two magnet assemblies each have end surfaces that are adjacent the voice coil 1 and exhibit a height difference, so that when the voice coil 3 is supplied with electrical power, an alternate current signal is fed into the voice coil 3, and the voice coil 3 so electrified is acted upon by a magnetic field force in the constant magnetic field to reciprocally move. During such a process, when the voice coil 1 is moving downwards, at least a portion of the voice coil 1 becomes located between the end surfaces of the lower-side external magnet (namely the first external magnet 2) and the lower-side internal magnet (namely the first internal magnet 3) that exhibit a height difference; and when the voice coil is moving upwards, at least a portion of the voice coil 1 becomes located between the end surfaces of the upper-side external magnet (namely the second external magnet 5) and the upper-side internal magnet (namely the second internal magnet 6) that exhibit a height difference, and thus, the BL value of electromechanical coupling factor is further enhanced, and the sensitivity is further improved.

Figure 7:
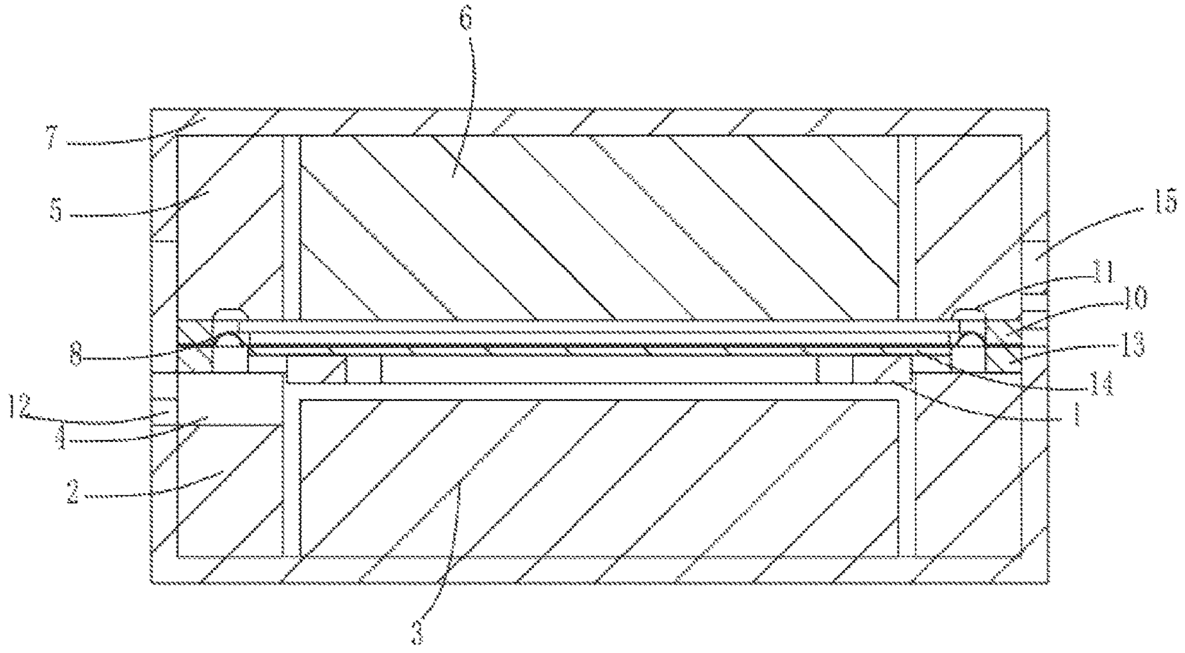
FIG. 7 is a cross-sectional view, in a schematic form, showing a structure of a speaker provided in an embodiment of the present invention (in which a portion where a diaphragm ring is arranged is prior art)

As shown in FIG. 7, further, the speaker provided according to the instant embodiment further comprises an enclosure 7, wherein the vibration diaphragm 9 comprises a diaphragm film 8 and a cone 14. The diaphragm film 8 is disposed on an upper surface of the cone 14, and the voice coil 1 is connected to a lower surface of the cone 14. The voice coil 1 is located on one side of the vibration diaphragm 9 that faces the first external magnet 2 and the first internal magnet 3. The first external magnet 2, the second external magnet 5, the first internal magnet 3, the second internal magnet 6, the voice coil 1, and the vibration diaphragm 9 are all arranged inside the enclosure 7.

To fix the diaphragm film 8 inside the enclosure 7, a gasket ring 10 is provided. The gasket ring 10 is located on an upper side of the vibration diaphragm 9, namely located in a front compartment of the speaker. The gasket ring 10 is of a ring shape which corresponds to/conforms with a contour of the diaphragm film 8 in order to fix the diaphragm film 8. The vibration diaphragm 9 separates the front compartment and the rear compartment of the speaker from each other. The gasket ring 10 is located in the front compartment on the upper side. The enclosure 7 is formed, at a location corresponding to the front compartment, with a first sound port 15, and the gasket ring 10 is formed with an opening section. In this way, the opening section of the gasket ring 10 connects and communicates between the front compartment of the speaker and the first sound port 15, and the first sound port 15 functions for output of sound. A sound emitted from the speaker passes through the first sound port 15 of the front compartment to transmit to the outside space.

Figure 8:
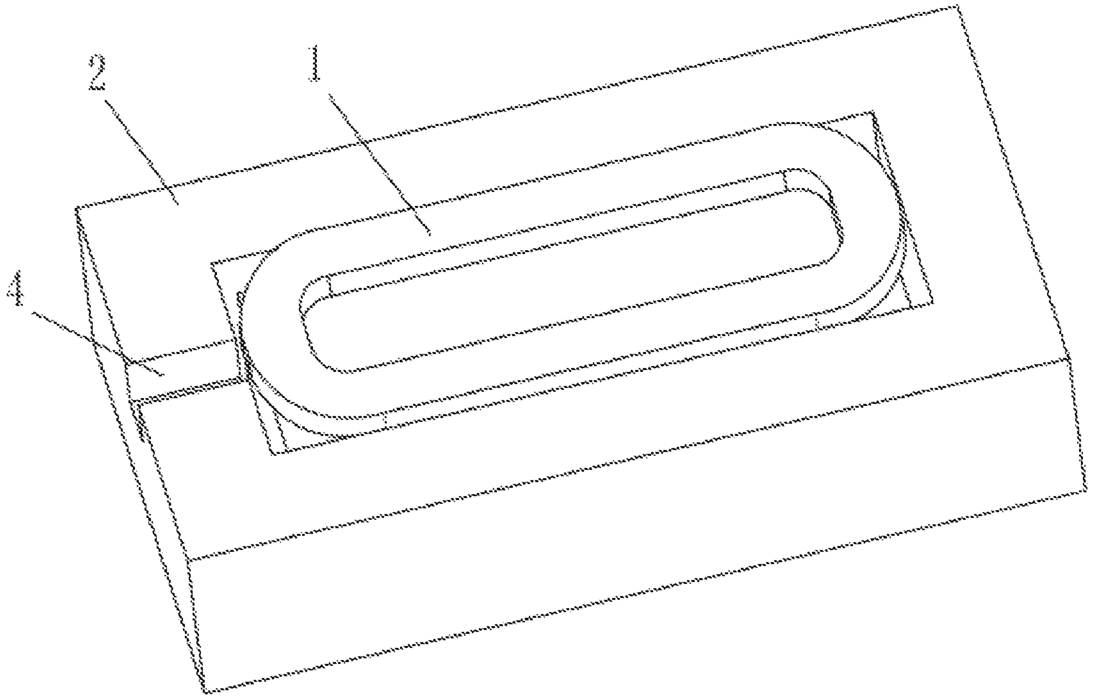
FIG. 8 is a schematic view showing an assembling arrangement in a rear compartment of a speaker provided in an embodiment of the present invention.

Arranged below the vibration diaphragm 9 is the rear compartment of the speaker. As shown in FIG. 7, in the prior art, a diaphragm ring 13 is further arranged in the rear compartment, and the prior art adopts an arrangement that an opening section is formed in the diaphragm ring 13, such that the opening section and a second sound port 12 of the enclosure 7 communicate between the rear compartment and the outside space. The opening section is subject to constrain of a thickness of the diaphragm ring 13, and a height of the opening section (in a thickness direction of the diaphragm ring) is relatively small, detrimental to enhancing of high frequency sounding. The present embodiment removes the diaphragm ring 13 from the rear compartment, and as shown in FIG. 8, as a substitute measure, the hollow channel 4 is formed in the external magnet, such that the hollow channel 4 communicates between the rear compartment of the speaker and the second sound port 12 formed in the enclosure 7 at a location corresponding to the rear compartment. The second sound port 12 of the enclosure 7 communicates between the hollow channel 4 and the outside space. The hollow channel 4 formed in the external magnet 2 is adjustable in respect of the size and shape thereof to suit the needs of actual requirements so as to be advantageous for improvement of sound quality. Further, the application removes the diaphragm ring 13 so that a distance between top-side and bottom-side magnets and a distance from the voice coil 1 to the bottom-side magnet are reduced to thereby enhance magnetic induction strength in an area of the voice coil 1.

Further, the diaphragm film 8 comprises a projecting portion (which is a bent ring), the second external magnet 5 is provided, on a portion thereof that corresponds to the diaphragm film 8 of the vibration diaphragm 9, an inward recessed portion 11, which corresponds, in shape, to the projecting portion (the bent ring) of the diaphragm film 8.

In the prior art, a distance of the projecting portion (the bent ring) of the diaphragm film 8 relative to the external magnet is less than distances of other portions of the vibration diaphragm 9 relative to the external magnet, so that a sound wave is subject to blocking at this site and this is detrimental to the sensitivity of the speaker. While in the present design, the projecting portion helps enhance the acoustic pressure level at the site of the first sound port 15.

The above provides only the preferred embodiment of the present invention and is not intended to impose limitation to the present invention. Modifications, equivalent substitutes, and improvement that are realized within the spirit and scope of the present invention should be regarded as being included in the scope of protection covered by the present invention.

What is claimed is:

1. A speaker, comprising:

a vibration diaphragm;

a voice coil connected to the vibration diaphragm;

a first magnet comprising an end adjacent to the voice coil and an opposite end distant from the voice coil, of which magnetic polarities are opposite to each other; and a second magnet comprising an end adjacent to the voice coil and an opposite end distant from the voice coil, of which magnetic polarities are opposite to each other;

wherein the voice coil has an effective width that is greater than a magnetic gap between the first magnet and the second magnet, at least a portion of the voice coil is arranged to align with the gap between the first magnet and the second magnet;

the ends of the first magnet and the second magnet that are adjacent to the voice coil are of opposite magnetic polarities; and the first magnet and the second magnet exhibit a height difference between end surfaces thereof on a same side, and at least a portion of the voice coil is located between the end surface of the first magnet and the end surface of the second magnet that exhibit the height difference.

2. The speaker according to claim 1, wherein the height difference between the first magnet and the second magnet is greater than a thickness of the voice coil.

3. The speaker according to claim 1, wherein one of the first magnet and the second magnet that is relatively high has a magnet height that is less than 1.25 times of a magnet height of one of the first magnet and the second magnet that is relatively low.

4. The speaker according to claim 1, wherein an avoidance notch is formed in the first magnet and/or the second magnet, and a portion of the voice coil is located at a site of the avoidance notch.

5. The speaker according to claim 1, wherein a distance between a bottom surface of the voice coil and one of the first magnet and the second magnet that is relatively low is greater than a vibration amplitude of the voice coil, and a distance between a bottom surface of the vibration diaphragm and one of the first magnet and the second magnet that is relatively high is greater than the vibration amplitude of the voice coil.

6. The speaker according to claim 1, wherein the first magnet comprises a first external magnet that is of a ring-shape, the second magnet comprises a first internal magnet, and the first external magnet surrounds the first internal magnet.

7. The speaker according to claim 6, wherein a hollow channel is formed in the first external magnet and communicates between outside and inside surfaces of the first external magnet, and the hollow channel communicates between a rear compartment of the speaker and an outside space.

8. The speaker according to claim 6, wherein the speaker further comprises a second external magnet that is arranged opposite to the first external magnet, and a second internal magnet that is arranged opposite to the first internal magnet, and ends of the second external magnet and the first external magnet that correspond to each other have a same magnetic polarity, and ends of the second internal magnet and the first internal magnet that correspond to each other have a same magnetic polarity, and ends of the second external magnet and the second internal magnet that are on a same side have opposite magnetic polarities.

9. The speaker according to claim 8, wherein a structure of the second external magnet is identical to a structure of the first external magnet, and/or a structure of the second internal magnet is identical to a structure of the first internal magnet.

10. The speaker according to claim 7, wherein a height difference is formed between end surfaces of the first external magnet and the first internal magnet that are adjacent to the voice coil, a height difference is formed between end surfaces of the second external magnet and the second internal magnet that are adjacent to the voice coil.

11. The speaker according to claim 10, wherein at least a portion of the voice coil is located between the end surface of the first external magnet and the end surface of the first internal magnet between which the height difference is formed; and/or, at least a portion of the voice coil is located between the end surface of the second external magnet and the end surface of the second internal magnet between which the height difference is formed.

12. The speaker according to claim 10, wherein the second external magnet is provided, on a portion thereof that corresponds to the vibration diaphragm, an inward recessed portion, which corresponds, in shape, to a bent ring of the diaphragm film, and the inward recessed portion is recessed in a direction that is parallel to a direction in which the bent ring of the vibration diaphragm protrudes.

* * * * *